W. P. RYAN.
FISHING TRAWL.
APPLICATION FILED MAY 19, 1914.
1,138,896.
Patented May 11, 1915.
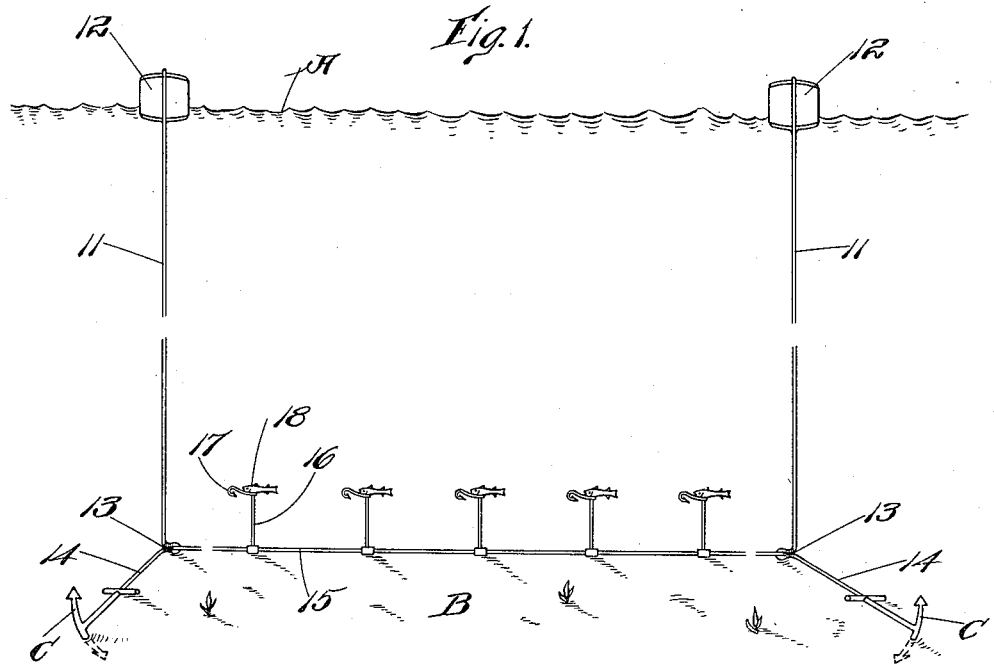
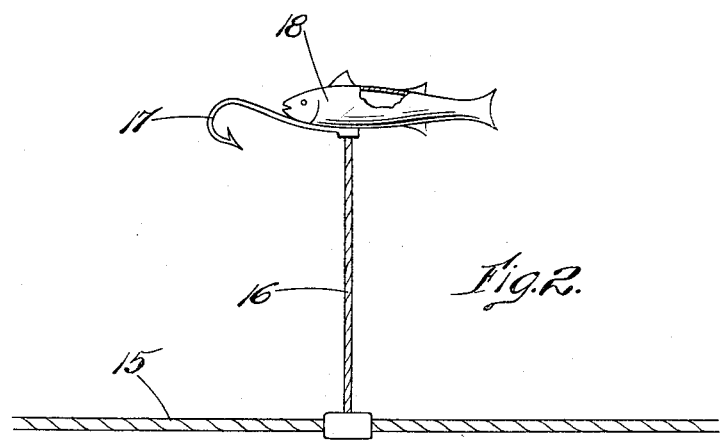
Witnesses:
John H. Parker
Helen M. Purcell
Inventor:
William P. Ryan
by MacLeod, Calver, Copeland & Dike
Attys.

UNITED STATES PATENT OFFICE.

WILLIAM P. RYAN, OF GLOUCESTER, MASSACHUSETTS, ASSIGNOR OF ONE-HALF TO EDWARD K. BURNHAM, OF GLOUCESTER, MASSACHUSETTS.

FISHING-TRAWL.

1,138,896.  Specification of Letters Patent.  Patented May 11, 1915.

Application filed May 19, 1914. Serial No. 839,632.

*To all whom it may concern:*

Be it known that I, WILLIAM P. RYAN, a citizen of the United States, residing at Gloucester, county of Essex, State of Massachusetts, have invented a certain new and useful Improvement in Fishing-Trawls, of which the following is a specification, reference being had therein to the accompanying drawings.

My invention relates to fishing trawls such as are commonly employed in catching cod, hake and the like. Trawls of this type are customarily known as ground-trawls and have a ground line with short hook lines or gangings at intervals throughout its length which are secured at one end of the ground line and are provided with hooks on their free ends. Heretofore so far as known to me in trawls of this type the hooks and gangings as well as the ground line rest on the bottom. I have found this to hinder the catching of fish for the hooks on the bottom may be buried in slime, or covered by star fish or the like so that the fish which swim slightly above the bottom, fail to find them.

The object of my invention is to produce a trawl, the hooks of which shall be at a predetermined distance above the bottom and, therefore, better located to be taken by the fish, a further object being to arrange them so that they will be moved about by the currents and in that manner materially aid in attracting the fish.

My invention will be fully understood from the following description taken in connection with the accompanying drawings and the novel features will be pointed out and clearly defined in the claims at the close of the specification.

In the drawings,—Figure 1 is a view of a trawl embodying my invention, the ground line of the trawl as shown resting on the bottom. Fig. 2 is a detail of my improved hook line or ganging.

Having reference to the drawings, there is shown at A the surface of the water, at B the bottom. At C is shown the anchors by which the trawl is secured in position. The trawl consists of a pair of under-running or buoy lines 11 having on one end buoys or kegs 12, and connected at 13 to the anchor line 14 to which are secured the anchors C. The ground line 15 which connects the buoy lines as shown, is preferably weighted, in a manner well known to those skilled in the art, to insure its resting on the bottom.

At intervals on the ground line, I provide hook lines or gangings 16 which are spaced apart at the ordinary distance. Each of these hook lines or gangings 16, is provided on its free end with a combination hook and float as shown in Fig. 2, the hook 17 being of any well known form and construction and being preferably secured at right angles to the hook line as shown. The float 18 is secured above the hook and is preferably in the form of a fish. I prefer this form of float because it attracts the fish and may be used to serve as bait when the fish are taking readily, but of course, bait may be used when desired. Other types of floats also such as floats composed of cork may be employed. The floats 18 are relatively small so that although they will keep the hooks and gangings off the bottom and retain them substantially in the position shown, they will not lift the ground line. The gangings are of sufficient length to permit the hooks to be retained at the distance above the bottom at which the fish ordinarily swim, and to waver or move about in the tide and, therefore, to attract the attention of the fish.

It will be seen from the foregoing that the ground line is below the hooks and the hooks are at a short distance above the bottom and, therefore, in a better position to be taken by the feeding fish, and furthermore they do not catch on the bottom and become broken when the trawl is hauled.

What I claim is:

1. In a trawl, the combination with a ground line of a ganging secured at one end to said ground line, a hook secured to the free end of said ganging, and a float secured on the upper side of said hook whereby it is retained in a horizontal position above the bottom.

2. The improved trawl comprising a ground line, anchors, and a buoy line, a plurality of gangings secured to said ground line at intervals throughout its length, a combination hook and float secured to each of said gangings comprising a hollow metal bait having a hook secured beneath it, said bait causing said hook to float above the bottom at a distance determined by the length of the ganging.

3. The improved ground trawl comprising a ground line adapted to rest on the bottom, a buoy line, a plurality of gangings secured to said ground line, a hook and a float secured to each of said gangings, said floats being adapted to retain said hooks at a predetermined distance above said ground line as it rests on the bottom.

In testimony whereof I affix my signature, in presence of two witnesses.

WILLIAM P. RYAN.

Witnesses:
ALLEN F. GRANT,
MILDRED H. GRANT.

Copies of this patent may be obtained for five cents each, by addressing the "Commissioner of Patents, Washington, D. C."